(12) United States Patent
Kohda et al.

(10) Patent No.: US 7,117,966 B2
(45) Date of Patent: Oct. 10, 2006

(54) BATTERY MOUNTING ARRANGEMENT FOR ELECTRICALLY POWERED VEHICLE

(75) Inventors: Hideo Kohda, Iwata (JP); Atsushi Koizumi, Iwata (JP); Ikuo Okamoto, Iwata (JP); Takeshi Nagase, Iwata (JP); Junji Terada, Iwata (JP)

(73) Assignee: Yamaha Hatsudoki Kabushiki Kaisha, (JP)

( * ) Notice: Subject to any disclaimer, the term of this patent is extended or adjusted under 35 U.S.C. 154(b) by 195 days.

(21) Appl. No.: 10/641,257

(22) Filed: Aug. 14, 2003

(65) Prior Publication Data

US 2004/0031632 A1  Feb. 19, 2004

(30) Foreign Application Priority Data

Aug. 16, 2002 (JP) .............................. 2002-237512

(51) Int. Cl.
*B60R 16/04* (2006.01)
(52) U.S. Cl. ..................... 180/68.5; 180/65.1; 429/100
(58) Field of Classification Search .............. 180/220, 180/65.1, 65.3, 65.5, 68.5; 429/99, 100
See application file for complete search history.

(56) References Cited

U.S. PATENT DOCUMENTS

| | | | | |
|---|---|---|---|---|
| 5,094,315 | A |  | 3/1992 | Taki et al. .................... 180/219 |
| 5,207,288 | A | * | 5/1993 | Ono ............................ 180/220 |
| 5,421,427 | A | * | 6/1995 | Ogawa et al. ............... 180/220 |
| 5,513,721 | A | * | 5/1996 | Ogawa et al. ............... 180/220 |
| 5,570,752 | A | * | 11/1996 | Takata ......................... 180/206 |
| 5,577,747 | A | * | 11/1996 | Ogawa et al. ............... 180/220 |
| 5,613,569 | A | * | 3/1997 | Sugioka et al. ............ 180/68.5 |
| 5,626,979 | A | * | 5/1997 | Mitsui et al. .................. 429/97 |
| 5,789,898 | A |  | 8/1998 | Suzuki et al. .................. 320/2 |
| 6,016,882 | A | * | 1/2000 | Ishikawa ..................... 180/205 |
| 6,056,077 | A |  | 5/2000 | Kobayashi ................... 180/216 |
| 6,176,338 | B1 | * | 1/2001 | Nakagawa et al. ......... 180/219 |
| 6,276,479 | B1 | * | 8/2001 | Suzuki et al. ............... 180/207 |
| 6,285,160 | B1 | * | 9/2001 | Tsai ............................ 320/112 |
| 6,326,765 | B1 | * | 12/2001 | Hughes et al. .............. 320/104 |
| 6,357,542 | B1 | * | 3/2002 | Sako .......................... 180/68.5 |
| 6,415,881 | B1 | * | 7/2002 | Tsai ........................... 180/68.5 |
| 6,568,496 | B1 | * | 5/2003 | Huang ........................ 180/220 |
| 6,644,693 | B1 | * | 11/2003 | Michisaka et al. .......... 280/835 |
| 6,679,345 | B1 | * | 1/2004 | Hirayama et al. ......... 180/65.3 |
| 6,699,616 | B1 | * | 3/2004 | Wu ............................. 429/98 |

(Continued)

FOREIGN PATENT DOCUMENTS

JP    8-301167    * 11/1996

*Primary Examiner*—Jeff Restifo
(74) *Attorney, Agent, or Firm*—Knobbe Martens Olson & Bear LLP

(57) ABSTRACT

An electrically-powered scooter including a front wheel, a rear wheel and a frame assembly. A handlebar assembly and a seat assembly are supported by the frame assembly. The frame assembly includes a left frame rail and a right frame rail spaced laterally from one another and extending between the handle bar assembly and the seat assembly. A battery support extends between the left and the right frame rails at a position intermediate the handle bar assembly and the seat assembly. A battery is supported by the battery support. In one arrangement, the battery support includes an enclosure defining a battery storage chamber. The enclosure includes a guide member configured to engage a guide recess of the battery to guide the battery into the battery storage chamber. In another arrangement, the battery may include a recharging port, an axis of which defines an oblique angle with an axis of the battery.

15 Claims, 16 Drawing Sheets

U.S. PATENT DOCUMENTS 6,722,460 B1 * 4/2004 Yang et al. ................. 180/220

2005/0092538 A1 * 5/2005 Baldwin et al. ............ 180/220

* cited by examiner

BATTERY MOUNTING ARRANGEMENT FOR ELECTRICALLY POWERED VEHICLE

RELATED APPLICATION

This application is related to, and claims priority from, Japanese Patent Application No. 2002-237512, the entire contents of which is hereby expressly incorporated by reference herein.

BACKGROUND OF THE INVENTION

1. Field of the Invention

The present invention relates, in general, to electrically powered scooters. More particularly, the present invention relates to a battery mounting arrangement for an electrically powered scooter.

2. Description of the Related Art

Due to concern for environmental damage associated with emissions from internal combustion engines, alternative means of propelling vehicles has received increased attention. Electric motors have been used to propel vehicles with some degree of success. However, batteries used to provide electricity to power the electric motors have been relatively large in size in order to provide an acceptable range of travel on a single charge of the battery. While battery size presents an issue for all vehicles, it is even more relevant for smaller vehicles, such as scooters, for example.

Motorized scooters have traditionally been relatively small in proportion and simple in appearance. It is desirable for a scooter to have a relatively large open area between a handle bar assembly and a seat of the scooter, in order to permit an operator to easily mount the scooter. Such a construction is referred to as a "step through" vehicle arrangement. In addition, preferably a relatively large open area is defined between the seat assembly and the rear wheel of the scooter in order to accentuate the lightweight appearance of the vehicle.

One challenge presented in adapting an electric power unit in a scooter is the positioning of a suitably sized battery, while still maintaining the traditional appearance of a scooter. For example, prior electrically driven scooters have been unable to adequately maintain the desired open space between the handle bar assembly and the seat assembly. In addition, prior battery positions have rendered removal of the battery difficult. Furthermore, prior arrangements have not protected the battery from contamination from foreign material, such as water, for example, to a satisfactory level.

SUMMARY OF THE INVENTION

Accordingly, a need exists for a battery mounting arrangement for an electrically driven scooter which overcomes the limitations of the prior art. Preferably, such a battery mounting arrangement permits the scooter to retain a traditional appearance.

One aspect of the present invention involves an electrically powered scooter including a frame assembly, a front wheel, and a rear wheel. A handle bar assembly and a seat assembly are supported by the frame assembly. The frame assembly includes a left frame rail and a right frame rail spaced from one another and extending between the handle bar assembly and the seat assembly. A battery support extends between the left and the right frame rails at an intermediate position between the handle bar assembly and the seat assembly. A battery is supported by the battery support.

Another aspect of the present invention involves an electrically powered vehicle including a frame assembly, at least one front wheel, and at least one rear wheel. A seat assembly is supported by the frame assembly. A battery casing is positioned beneath the seat assembly. An interior surface of the battery casing defines a chamber. A battery is supported within the battery casing. The battery casing includes an elongated first guide surface and the battery includes a second guide surface complimentary to the first guide surface. The second guide surface is configured to interlock with the first guide surface to guide the battery into the chamber.

Yet another aspect of the present invention involves an electrically powered vehicle comprising a frame assembly, at least one front wheel, and at least one rear wheel. A seat assembly is supported by the frame assembly. A battery is disposed beneath the seat assembly and defines an axis. The battery includes a charging port configured to receive a socket of a charging device. An axis of the charging port is at an oblique angle relative to the axis of the battery.

BRIEF DESCRIPTION OF THE DRAWINGS

These and other features, aspects and advantages of the present invention are be described with reference to drawings of a preferred embodiment, which is intended to illustrate, and not to limit, the present invention. The drawings contain 16 figures.

DETAILED DESCRIPTION OF THE PREFERRED EMBODIMENT

Figure 1:
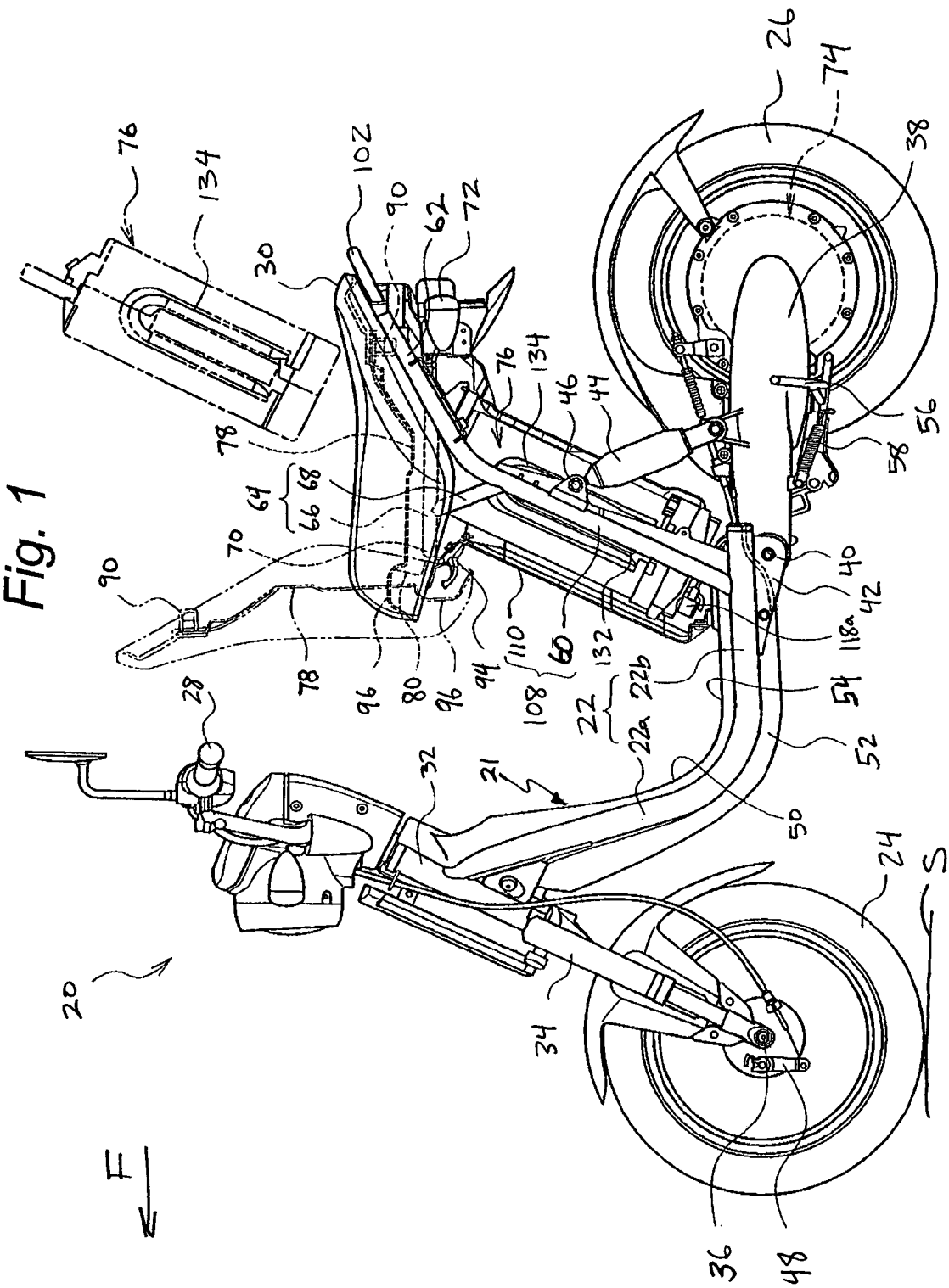
FIG. 1 is a side, elevational view of a scooter incorporating a preferred embodiment of the present battery and battery mount arrangement. The scooter includes a front wheel and a rear wheel connected to a frame assembly. A handle bar assembly and a seat assembly are supported by the frame assembly. A battery is positioned generally beneath the seat assembly.

FIG. 1 illustrates an electrically powered scooter, referred to generally by the reference numeral 20. The scooter 20 incorporates a preferred embodiment of a battery and battery mounting arrangement of the present invention. The scooter 20 is described in general detail in order to assist the reader's understanding of a preferred environment of use of the present battery and battery mounting arrangement. However, it will be appreciated by one of ordinary skill in the art that the present battery and battery mount arrangement may also be incorporated for use with other types of vehicles, such as golf carts or other vehicles having more than two wheels, for example. The scooter 20 is described with reference to a coordinate system wherein a longitudinal axis passes lengthwise through the vehicle 20. A vertical, central plane generally bisects the scooter 20 and includes the central axis. A lateral plane is normal to the central, vertical plane. Right and left directions are described from the perspective of a rider sitting in a normal operating position on the scooter 20. Relative heights are expressed as relative distances from a surface S upon which the scooter 20 operates. In several figures, an arrow F points in a direction of forward travel of the scooter 20.

With reference to FIG. 1, the scooter 20 includes a frame assembly 21. The frame assembly 21 includes a pair of laterally-spaced frame rails 22. Each frame rail 22 includes a downwardly inclined portion 22a, which extends from a forward end toward a rearward end of the scooter 20 and a horizontally extending portion 22b, which extends in a generally horizontal direction from a lower, rearward end of the inclined portion 22a. In the illustrated embodiment, the inclined portion 22a and the horizontal portion 22b are a continuous, tubular structure. Alternatively, the portions 22a and 22b may be separate components connected to one another.

A front wheel 24 and a rear wheel 26 are supported by the frame assembly. A handle bar assembly 28 is supported by the frame assembly 22 in a position generally forwardly of an operator of the scooter 20. A seat assembly 30 is supported generally rearwardly of the handlebar assembly 28 and is configured to support an operator of the scooter 20 in a straddle-type fashion. Preferably, a generally open area is defined between the handle bar assembly 28 and the seat assembly 30 to permit ease of mounting of the scooter 20 by an operator. Such a construction may be referred to as a "step through" arrangement.

The frame assembly 21 also includes a head tube 32 which, in the illustrated arrangement, is connected to forward ends of the left and right frame rails 22. The head tube 32 supports a front fork assembly 34 for a rotation about a steering axis. The front wheel 24 is supported at a lower end of the fork 34 for rotation about an axle 36. The rear wheel 26 of the scooter 20 is supported on a rearward end of a swing arm 38, a forward end of which is connected to the frame assembly 21 by a pivot 40. Thus, the swing arm 38 is pivotal relative to the frame assembly 21.

In the illustrated embodiment, the pivot 40 is supported by a pair of brackets 42 connected to a lower, rearward end of each of the horizontal portions 22b of the frame rails 22. A rear shock absorber 44 is pivotally connected to an intermediate portion of the swing arm 38 and extends in an upward direction to the frame assembly 22. An upper end of the shock absorber 44 is pivotally mounted to a bracket 46 of the frame assembly 22. In the illustrated embodiment, a single shock absorber 44 is provided between the swing arm 38 and the frame assembly 22 on a left side of the rear wheel 26. However, more than one shock absorber 44 may be provided and may assume alternative orientations, as will be appreciated by one of ordinary skill in the art.

Preferably, one or more operator controls are mounted on the handle bar assembly 28. For example, commonly, a throttle control is mounted on a right side of the handle bar assembly 28 and is operable to control a speed of the scooter 20. In addition, one or more brake control levers (not shown) are mounted on left and/or right sides of the handle bar assembly 28. One of the control levers is operably connected to an actuating arm 48 of the front brake assembly. The actuating arm 48 is configured to operate the front brake to apply a force tending to slow the front wheel 24. An operator of the scooter 20 operates the control lever to selectively activate the front brake. The same, or an additional control lever, is operably connected to a rear brake assembly, which preferably is configured to slow the rear wheel 26 of the scooter 20 in a similar manner.

An upper cover 50 extends between the left frame rail 22 and the right frame rail 22 on an upper side of the frame rails 22. Preferably, the upper cover 50 extends generally the entire length of the frame rails 22. Similarly, a lower cover 52 extends between the frame rails 22 on an underneath side of the frame rails 22 and, preferably, extends generally the entire length of the frame rails 22. An upward facing surface of the upper cover 50 defines a foot rest area 54 for an operator of the scooter 20. Although such an arrangement is preferable, other suitable arrangements to provide a foot support for an operator of the scooter 20 may also be used.

The illustrated scooter 20 also includes a support stand, such as center stand 56, which is pivotal from an upward, or stowed, position (as illustrated in FIG. 1) to a lowered position wherein the center stand 56 supports the scooter 20 with the rear wheel 26 raised above the surface S upon which the scooter 20 rests, in a well known manner. A biasing member, such as a return spring 58, is configured to bias the center stand 56 toward its stowed position. Alternatively, other types of support stands may be incorporated on the scooter 20, such as a side stand, for example.

As described above, the seat assembly 30 is supported at a raised elevation from a horizontal portion 22b of the frame assembly 22. The scooter 20 includes a seat support frame 60, which is connected to a rearward portion of the horizontal portion 22b and extends in an upward direction therefrom. Preferably, the support frame 60 is canted at a rearward angle from a vertical plane. Similar to the frame rails 22, preferably, the support frame 60 includes a pair of laterally space rails. An upper end 62 of the support frame 60 is canted rearwardly from the lower portion of the support frame 60. The upper end, or extension 62, of the support frame 60 supports a rearward end of the seat assembly 30.

A seat stay assembly 64 is connected to a transition between the lower end of the support frame 60 and the extension 62 and supports a forward end of the seat assembly 30. The seat support stay assembly includes a first stay member 66, which extends forwardly from the support frame 60 in a generally horizontal orientation. The first stay member 66 preferably is U-shaped with each of its ends connected to opposing rails of the support frame 60.

The seat stay assembly 64 also includes a second stay member 68, which extends upwardly from the support frame 60 to support a forward end of the first seat stay 66. Preferably, the second seat stay 68 is also U-shaped with its ends being connected to opposing sides of the support frame 60. The individual members making up the frame assembly 21, including the frame rails 22, the support frame 60, and the seat stay assembly 64 preferably are tubular members welded together. However, other suitable constructions apparent to those of ordinary skill in the art may also be used.

A central, forward portion of the first stay 66 defines a connecting portion 70, to which the seat assembly 30 is connected, as is described in greater detail below. Furthermore, in addition to supporting the seat assembly 30, the seat stay assembly 64 also supports auxiliary members of the scooter 20, such as a tail lamp 72, for example.

The scooter 20 includes a power unit 74 drivingly coupled to the rear wheel 26. Preferably, the power unit 74 includes an electric motor (not shown), which is configured to drive the rear wheel 26. The power unit 74 is connected to a battery 76, which supplies electrical power to the power unit 74. The battery 76 may be of any suitable type and, in the illustrated embodiment, is supported beneath the seat assembly 30. Preferably, the battery 76 is positioned between the laterally spaced rails of the support frame 60. Such an arrangement efficiently utilizes available space, while permitting the scooter 20 to maintain a traditional appearance. A preferred embodiment of a mounting assembly for the battery 76 is described in greater detail below.

Figure 2:
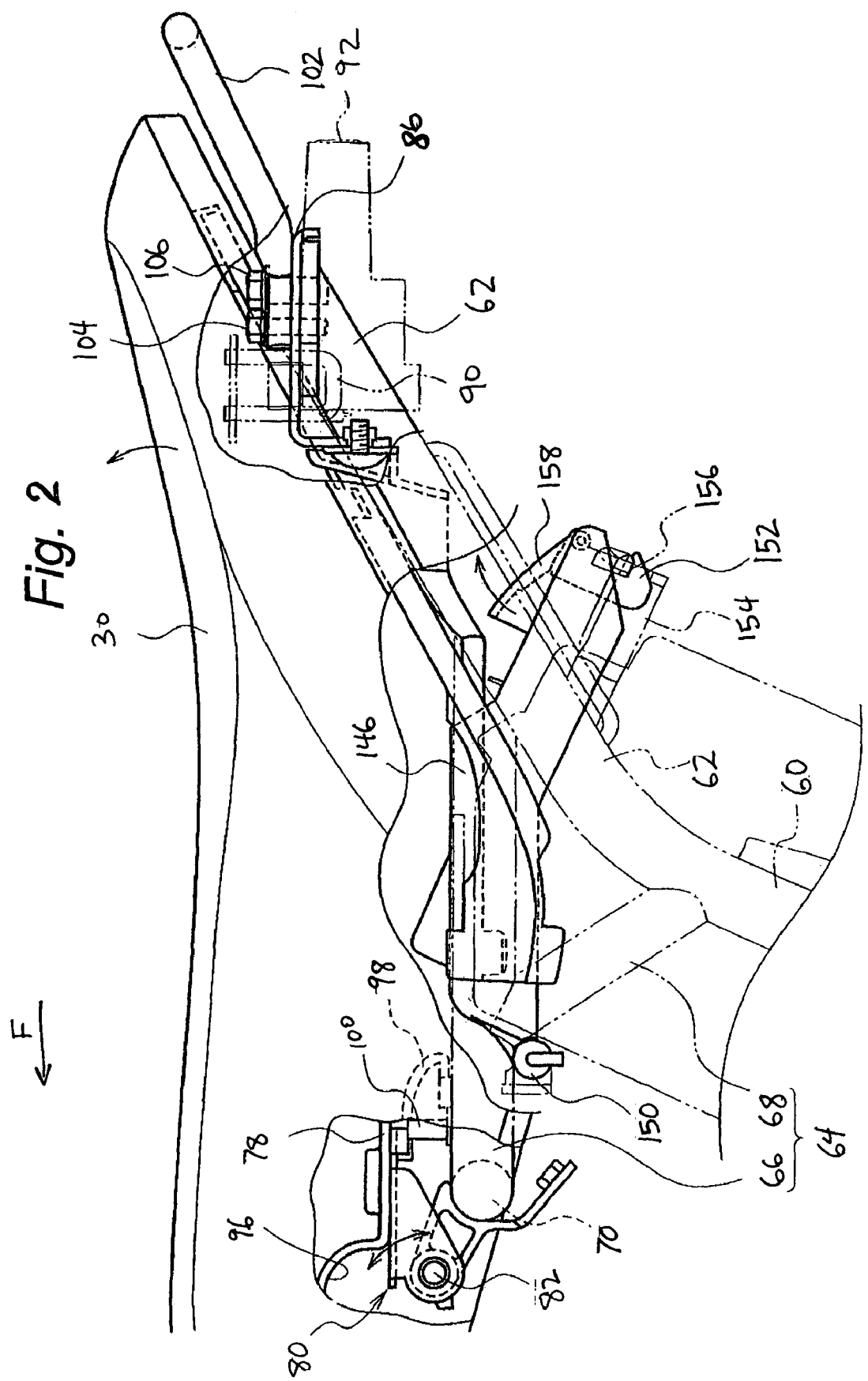
FIG. 2 is an enlarged view of a rear portion of the seat assembly of the scooter of FIG. 1, with portions cut away to reveal internal elements.
Figure 3:
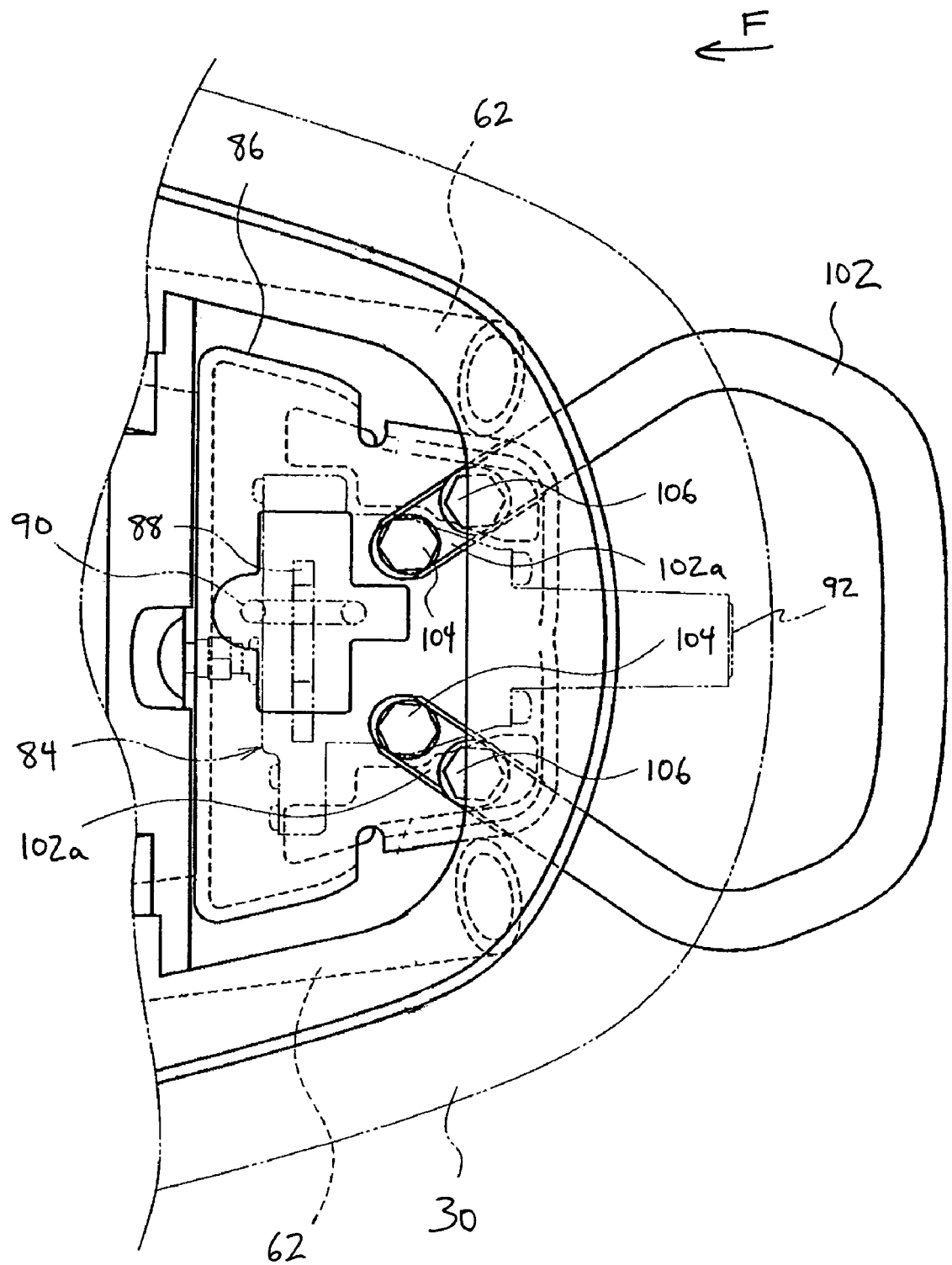
FIG. 3 is a top view of a rear portion of the scooter of FIG. 1, with certain elements shown in phantom.
Figure 4:
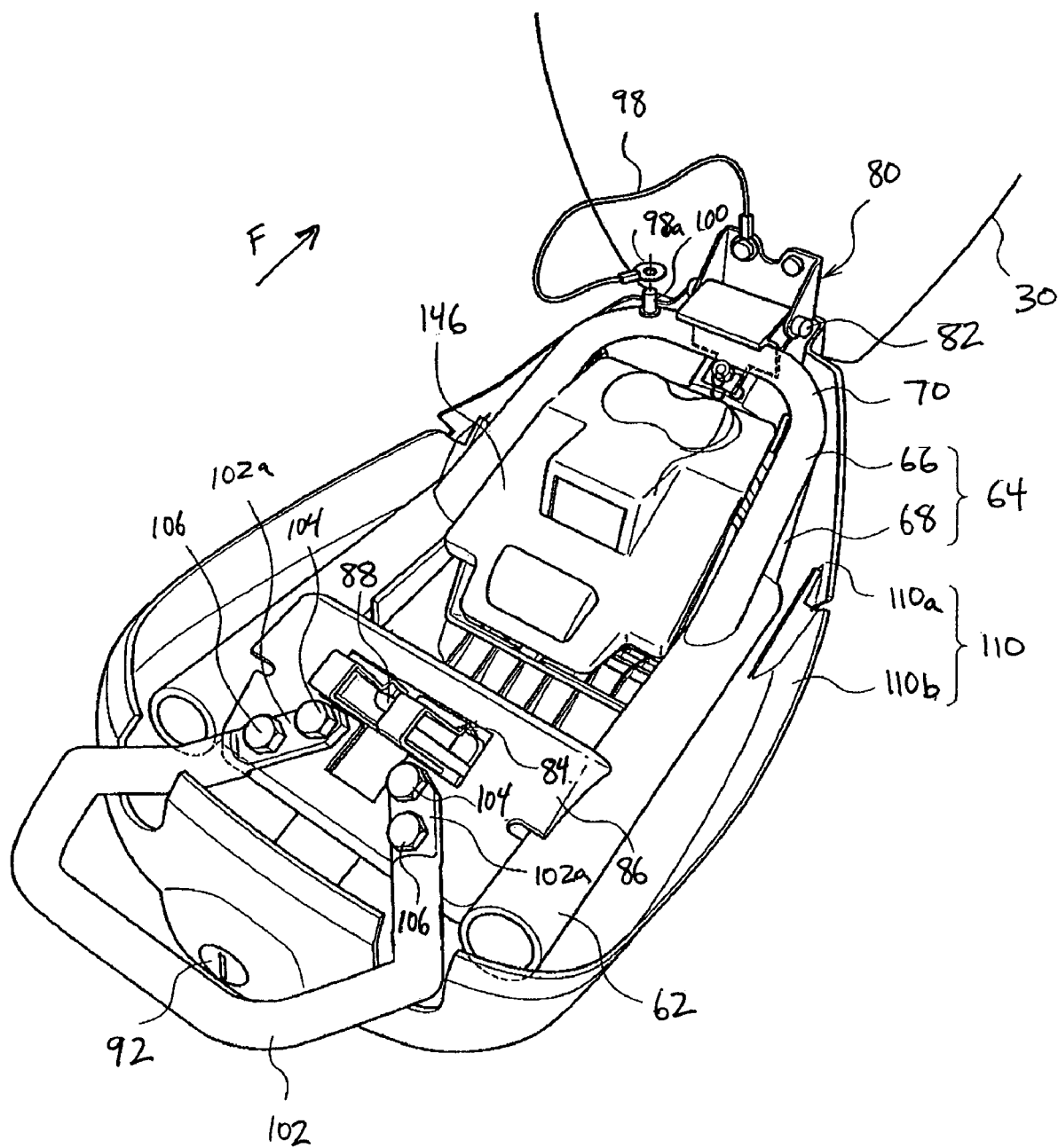
FIG. 4 is a perspective view of a rear portion of the scooter of FIG. 1, with the seat assembly in a tilted forward, open position.

With additional reference to FIG. 2, the seat assembly 30 is described in greater detail. The illustrated seat assembly 30 includes a seat base 78, which functions as an inner support frame of the seat assembly 30. The seat assembly 30 is pivotal from a closed, operational position (shown in solid lines in FIG. 1), wherein an operator of the scooter 20 is able to sit thereon, to an open position (shown in dashed lines FIG. 1). The open position of the seat assembly 30 permits the battery 76 to be removed from the scooter 20.

A hinge assembly 80 is connected to the connection portion 70 of the first seat stay 66. The hinge assembly 80 includes a hinge pin 82 about which the seat assembly is pivotable. The seat assembly 30 also includes a latch mechanism 84, which is configured to selectively retain the seat assembly 30 in the closed position.

Preferably, a support plate 86 extends between end portions of the laterally spaced extensions 62 of the support frame 60. A latch 88 is fixed to the support plate 86 and is configured to receive and selectively retain a striker 90, which is secured to the base 78 of the seat assembly 30. An actuator is operatively coupled to the latch 88 to move the latch 88 from a position retaining the striker 90 to a position releasing the striker 90. In the illustrated embodiment, the actuator for the latch 88 is a key cylinder 92 configured to receive a matched key and release the seat assembly 30 upon turning of the key, in a well-known manner.

With reference to FIG. 1, preferably the scooter includes a hook 94 extending in a forward direction below a forward portion of the seat assembly 30. The hook 94 is configured to be capable of supporting the handle(s) of a bag. Thus, an operator of the scooter 20 is able to hang a bag from the hook 94 and position it between his or her legs while operating the scooter 20. A recess 96 of the seat base 78 is configured to accommodate the hook 94 when the seat is in a forward-tilted, or open position, as illustrated in FIG. 1.

Figure 5:
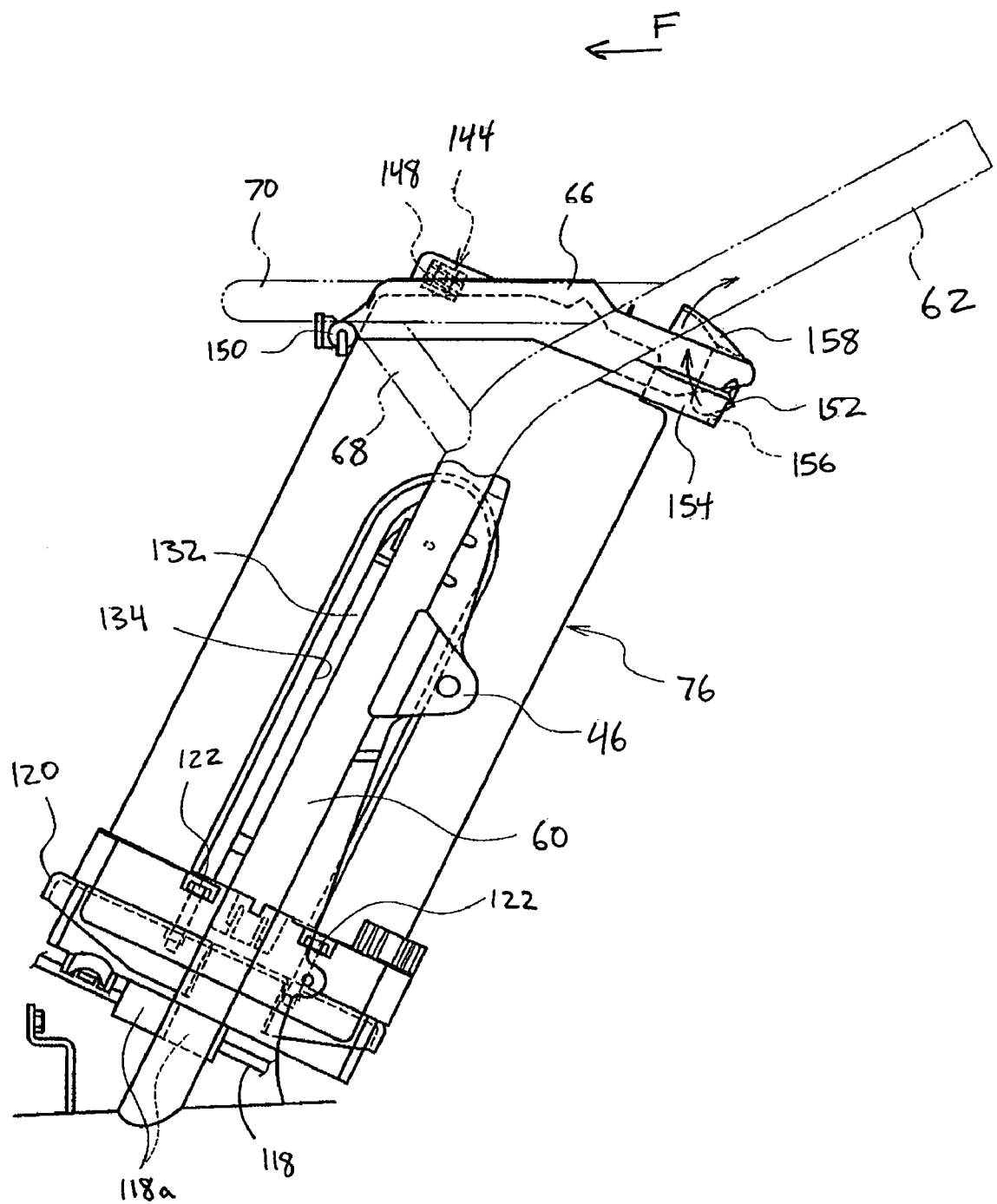
FIG. 5 is a side, elevational view of the battery mounting arrangement of the scooter of FIG. 1, with certain elements of the scooter removed for clarity.

With reference to FIGS. 2 and 5, preferably the scooter 20 includes a helmet securing mechanism. The illustrated helmet securing mechanism includes a helmet support wire 98, one end of which is secured to the hinge assembly 80. A second end of the helmet support wire 98 includes a loop member 98a, which is configured to pass over a helmet wire pin 100. In operation, the helmet support wire 98 is passed through a portion of a helmet, such as a helmet strap buckle, and the loop member 98a is placed over the pin 100. With the seat assembly 30 in the closed position, the loop member 98a is prevented from being removed from the pin 100, thereby preventing the helmet from being removed from the helmet support wire 98. Alternatively, other suitable arrangements apparent to those of skill in the art may also be used.

Preferably, a handle 102 is provided in a position rearward of the seat assembly 30 to enable an operator to grasp the handle 102 in order to lift the scooter 20 onto, or off of, the center stand 56. Preferably, the handle 102 is substantially U-shaped, with its ends defining mount portions 102a. Preferably, the mount portions 102a extend underneath a rearward end of the seat assembly 30 and are connected to the support plate 86 by fasteners, such as bolts 104, 106. Thus, in the illustrated embodiment, each mounting portion 102a is fixed to the support plate 86 by two fasteners, i.e., the bolts 104, 106, to permit a strong connection therebetween. Accordingly, the handle 102 may be used to lift the scooter 20 repeatedly, without failure or "play" developing. In the illustrated embodiment, the bolts 104, 106 also connect the latch 88 to the support plate 86. However, in an alternative embodiment, the latch 88 and the handle 102 may be separately connected to the support plate 86, or another support member of the scooter 20.

With reference to FIGS. 1, 5, 6 and 8, a preferred embodiment of a mounting arrangement for the battery 76 of the scooter 20 is described in greater detail. As described above, the illustrated battery mounting arrangement supports the battery 76 in a position beneath the seat assembly 30 to efficiently utilize space and permit the scooter 20 to retain a traditional appearance. In addition, the illustrated arrangement facilitates convenient removal, and reinsertion, of the battery 76 and inhibits foreign material, such as water, from coming into contact, or remaining in contact, with the battery 76.

Figure 6:
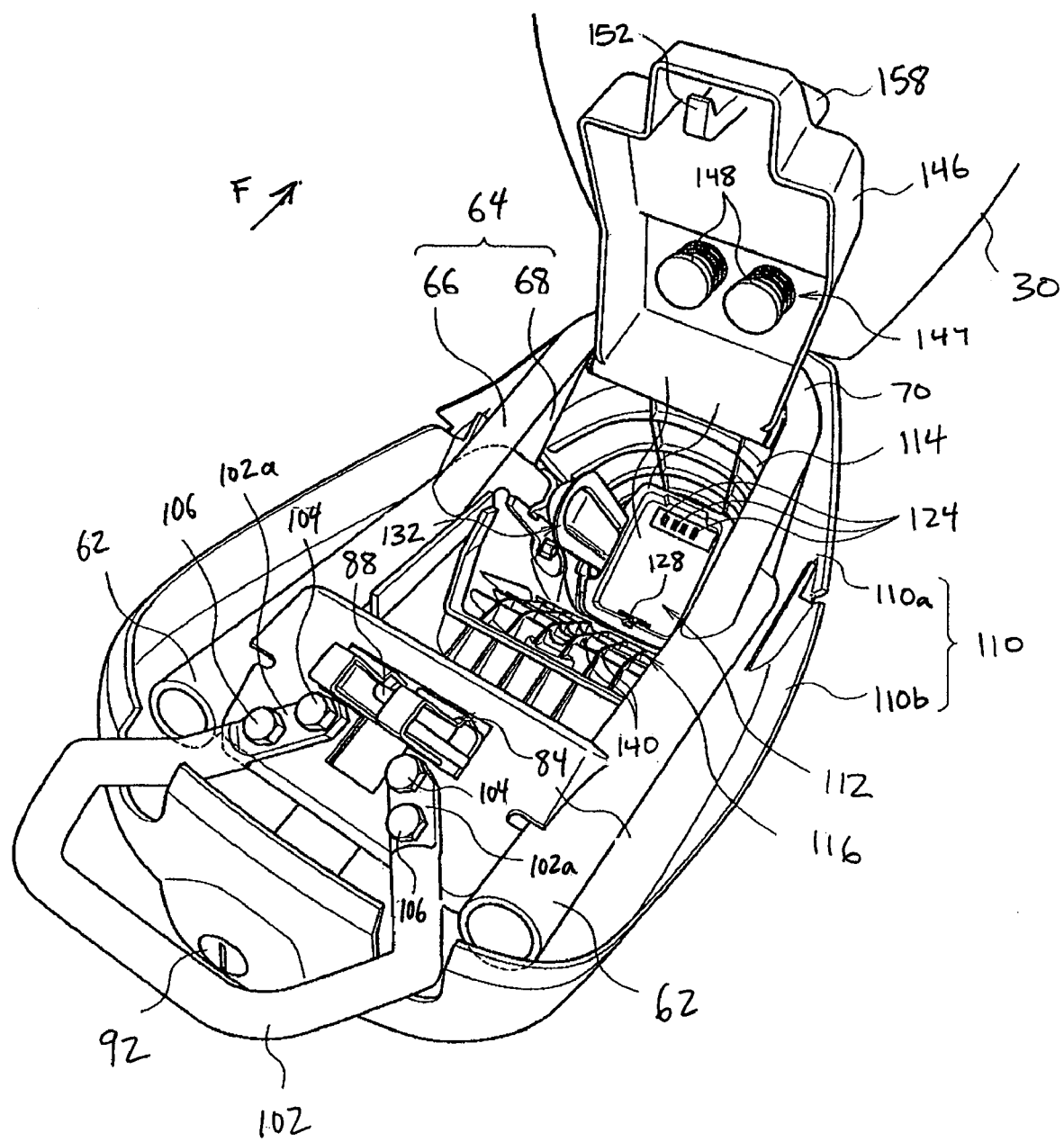
FIG. 6 is a perspective view of a rear portion of the scooter of FIG. 1, showing a casing defining a battery chamber.

The illustrated battery mount arrangement includes a seat base assembly 108, which includes the seat support frame 60 and a battery casing 110. With reference to FIG. 6, the battery casing 110 includes a front casing member 110a and a rear casing member 110b. The front and rear casing members 110a, 110b are generally semi-cylindrical in shape with open top and bottom ends. The front and rear casings 110a, 110b face one another and create a generally vertically oriented seam therebetween. Although it is preferred to provide the casing 110 in addition to the seat support frame 60, in an alternative embodiment, the casing 110 may be configured to have sufficient strength to support the seat assembly 30 without the frame 60.

Figure 8:
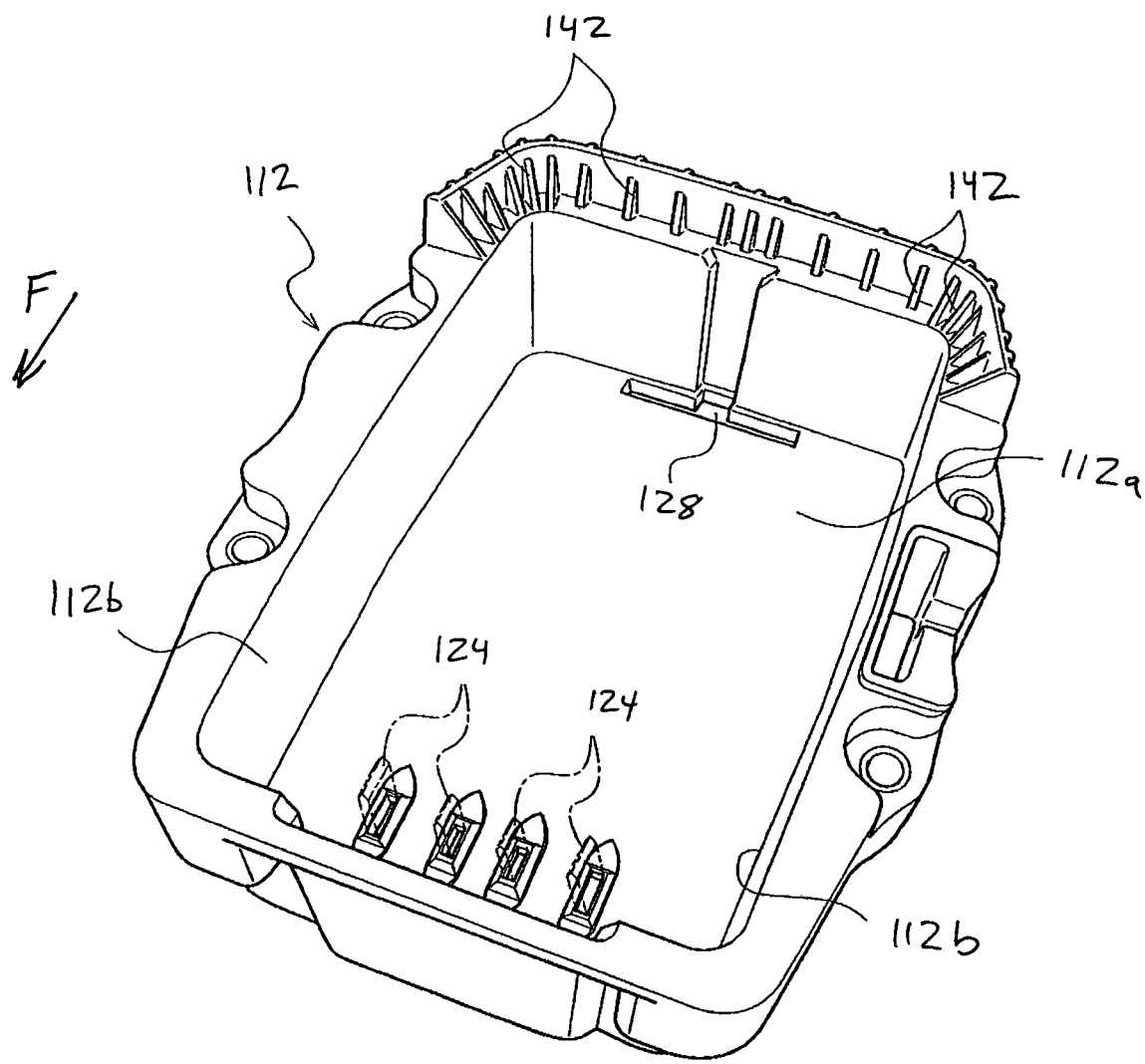
FIG. 8 is a perspective view of a battery support tray of the scooter of FIG. 1.

A battery support tray 112 closes a lower end of the casing 110. With reference to FIG. 8, the battery support tray 112 includes a bottom wall 112a and a peripheral wall 112b, which extends in an upward direction from the bottom wall 112a. The casing 110 and the battery support tray 112 cooperate to define a battery chamber 114 for the battery 76, which preferably encloses substantially the entire battery 76. An upper end of the casing 110 defines a port 116, which permits the battery 76 to be removed from the battery chamber 114. Although it is preferred that the port 116 is provided on an upper end of the casing 110, in an alternative arrangement, the port 116 may be provided on a forward, rearward, or lateral side of the casing 110, for example.

An electrical cable 118 extends between the battery 76 and the power unit 74 to transmit electrical power from the battery 76 to the power unit 74 to power the electrical motor therein. Preferably, the cable 118 is split into two portions connected by a coupler assembly 118a. In the illustrated embodiment, the coupler assembly 118a is positioned beneath the battery support tray 112 so as to be protected from water or the like, which may run downwardly along an outer surface of the casing 110. The coupler assembly 118a may comprise any suitable type of electrical connector and may include one or more individual connectors. In addition, other electrical components may be connected to the battery 76 by similar couplers, preferably positioned underneath the battery support tray 112.

Preferably, the battery support tray 112 also functions as a structural cross member between the spaced apart rails of the frame assembly 21 in general and, in the illustrated embodiment, between the rails of the seat support frame 60. With reference to FIG. 5, the illustrated battery mount arrangement includes a mount bracket 120 fixed to each of the rails of the seat support frame 60. The battery support tray 112 extends between the mounting brackets of the respective rail of the seat support frame 60 and is connected to the brackets 120 by fasteners, such as bolts 122. Thus, the battery support tray 112 both supports the battery 76 and functions as a structural frame member to minimize the number of parts used on the scooter 20, thereby reducing the overall weight of the scooter 20 and reducing manufacturing costs.

Figure 11:
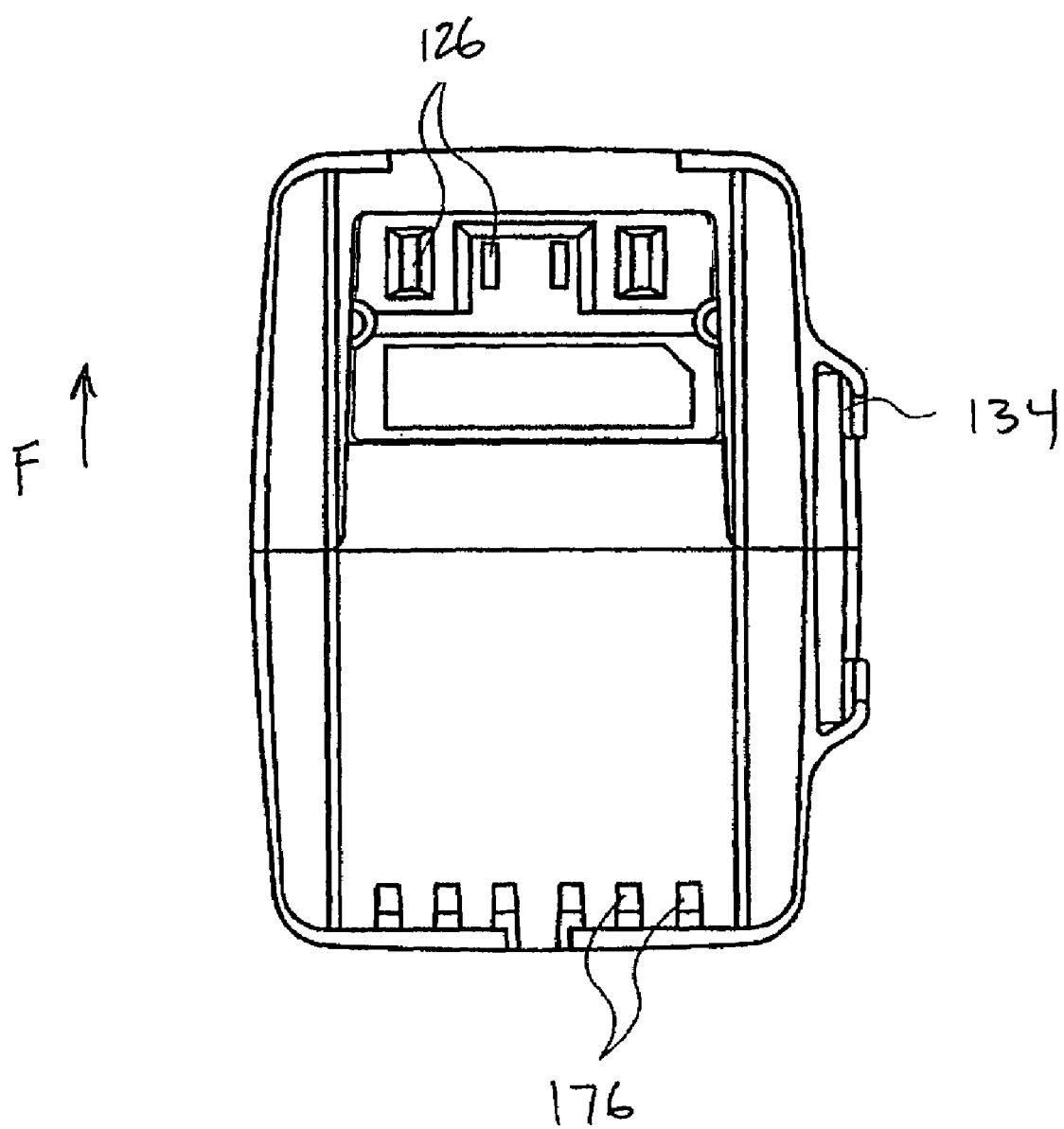
FIG. 11 is a bottom, plan view of the battery of FIG. 9.
Figure 12:
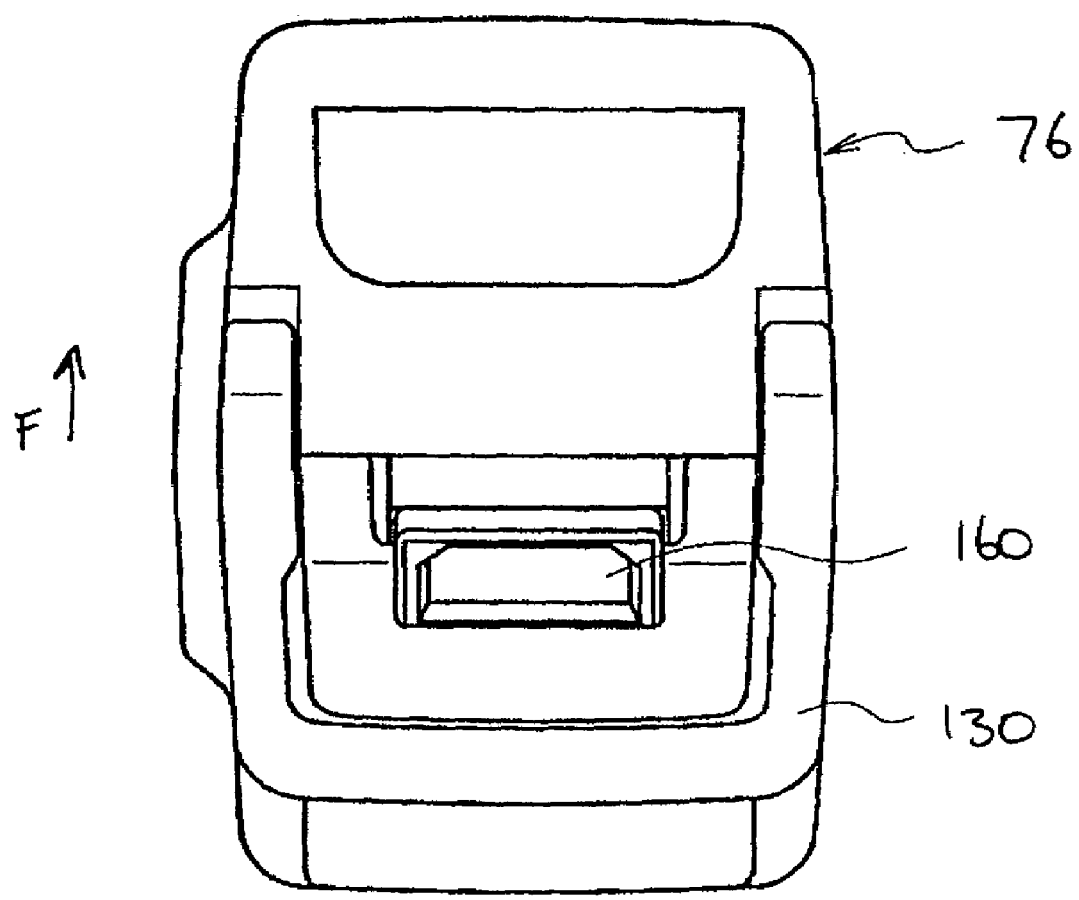
FIG. 12 is a top, plan view of the battery of FIG. 9.
Figure 13:
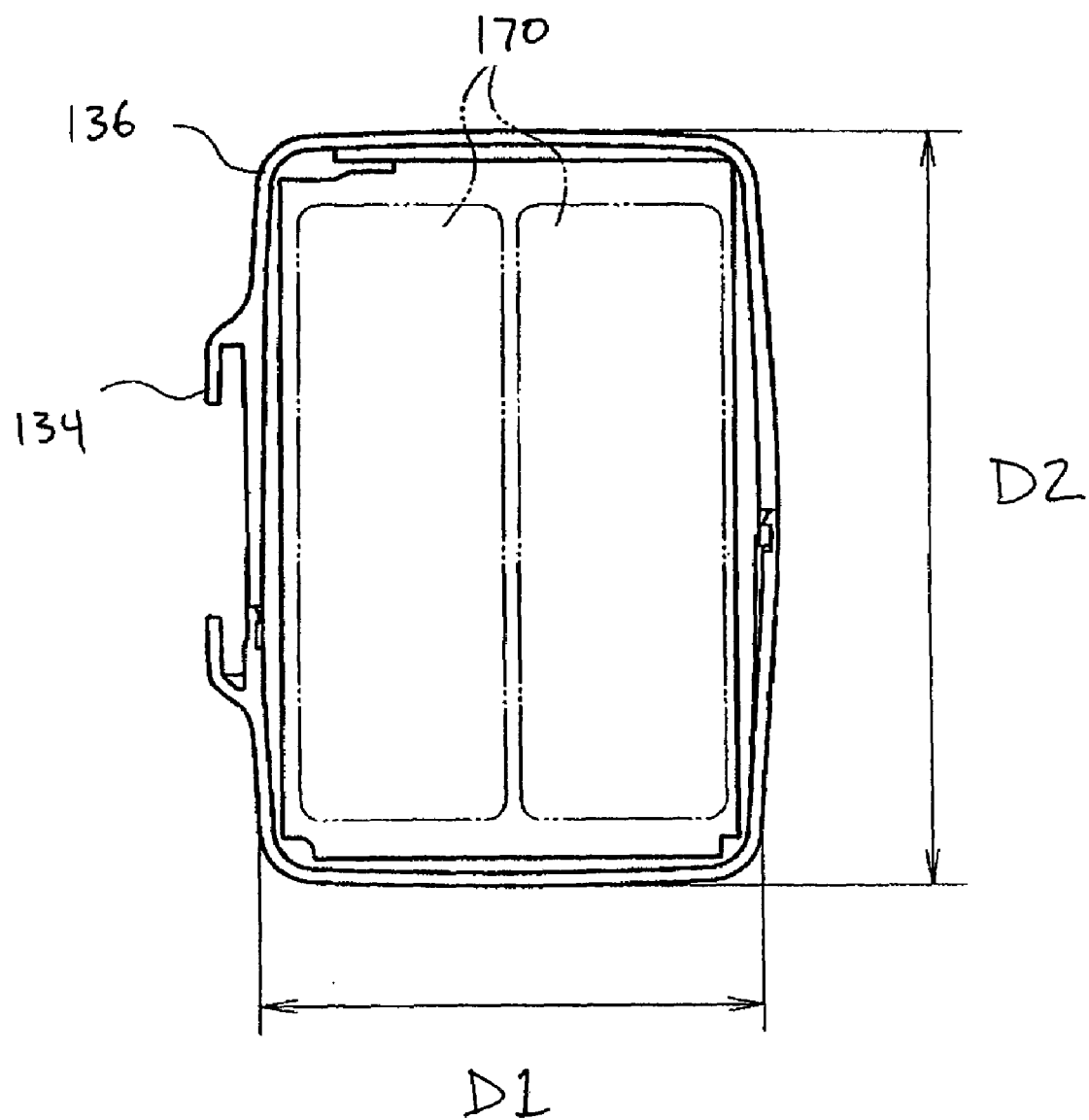
FIG. 13 is a cross-sectional view of the battery of FIG. 9, taken along view line 13—13 of FIG. 9.
Figure 14:
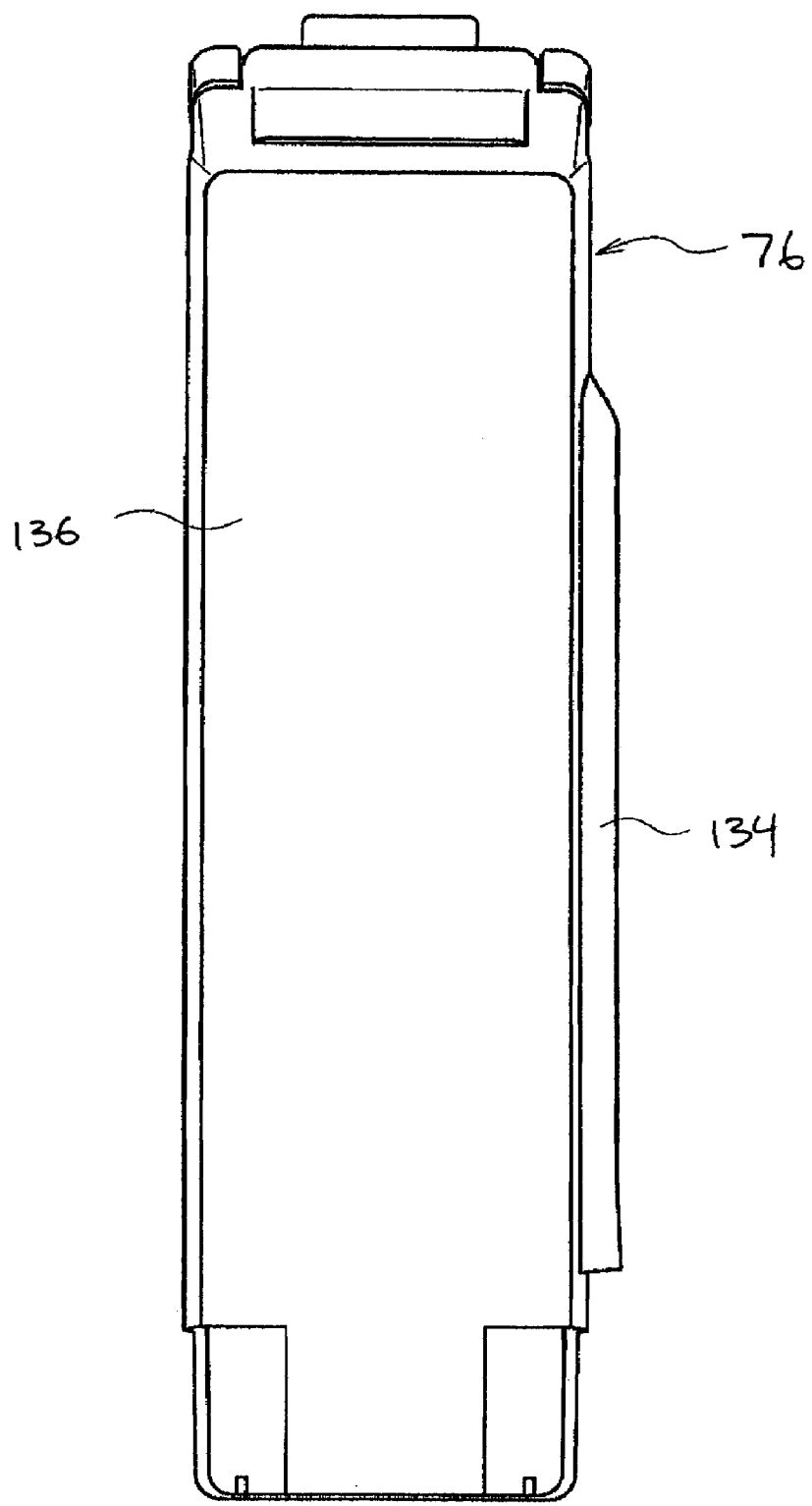
FIG. 14 is a front view of the battery of FIG. 9.
Figure 15:
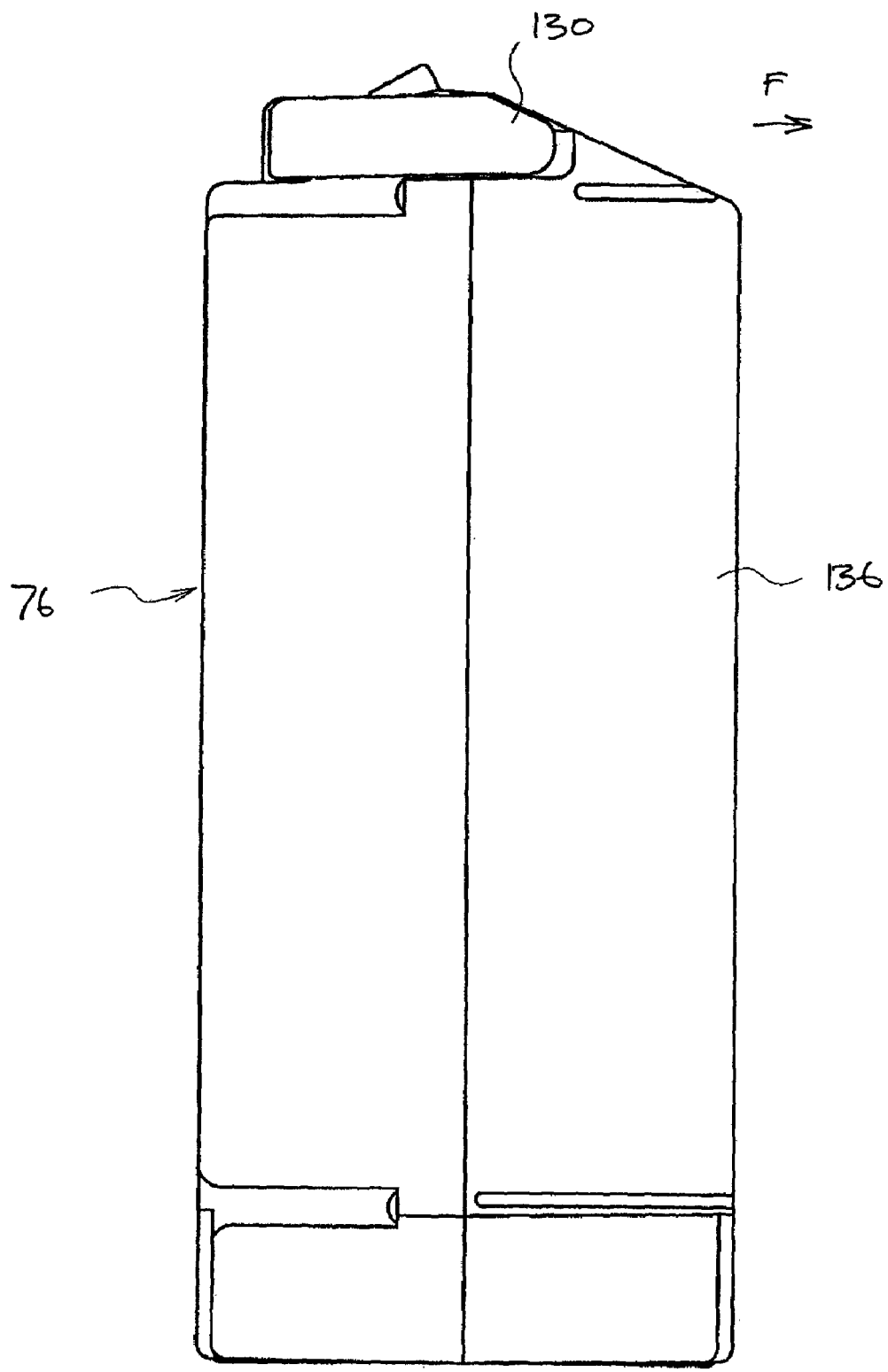
FIG. 15 is a right side view of the battery of FIG. 9.

Preferably, the bottom wall 112a of the battery support tray 112 includes one or more terminals 124, which connect with terminals 126 (FIG. 11) disposed on a bottom surface of the battery 76. The terminals 124 are connected to the cable 118 which, in turn, connects the battery 76 to the power unit 74, as described above.

In the illustrated embodiment, the bottom wall 112a of the battery support tray 112 additionally includes at least one drain opening 128. The drain opening 128 is provided on an opposite end of the bottom wall 112a from the terminals 124. As apparent in FIGS. 1 and 5, the casing 110, along with the battery support tray 112, are canted, or inclined, in a rearward direction along with the seat support frame 60. Thus, a forward end of the bottom wall 112a of the battery support tray 112 is positioned higher than a rearward end of the bottom wall 112a due to the rearward cant of the support tray 112. Preferably, the terminals 124 are positioned near a forward end of the bottom wall 112a, while the drain opening 128a is positioned at a rearward end of the bottom wall 112a. Accordingly, if water, such as rain water, were to enter the battery chamber 114 and come into contact with the battery support tray 112, the water would tend to flow away from the terminals 124 toward the drain opening 128, where it could exit the battery chamber 114.

Figure 10:
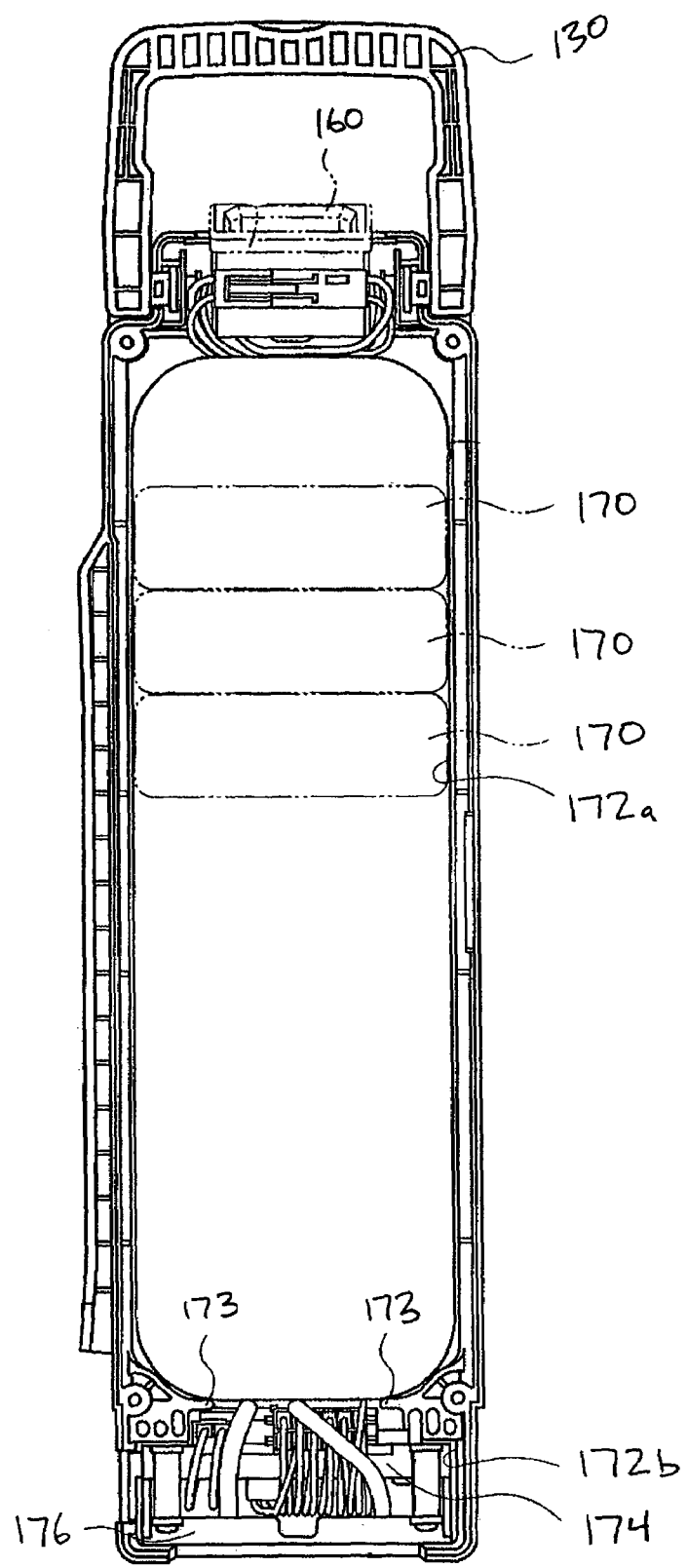
FIG. 10 is a cross-sectional view of the battery of FIG. 9, taken along a view line extending lengthwise through the battery.

In addition, the battery mounting arrangement also includes features that ease the insertion and removal of the battery 76 into the battery chamber 114. For example, with reference to FIG. 10, the battery includes a handle 130 at its upper end, which is configured to be pivotable from a stowed position, laying adjacent to an outer surface of the battery 76, to a raised position, wherein the handle 130 may be grasped to remove the battery 76 from the battery chamber 114.

Furthermore, an interior surface of the casing 110 includes a guide member 132, which projects outwardly from the remainder of the interior wall of the battery chamber 114. The guide member 132 preferably is elongate and extends generally along an axis of the battery chamber 114, which preferably is canted at substantially the same angle as the seat support frame 60. Preferably, the guide member 132 extends along a substantial length of the battery chamber 114 and, preferably, from near the port 116 to the battery support tray 112.

Figure 9:
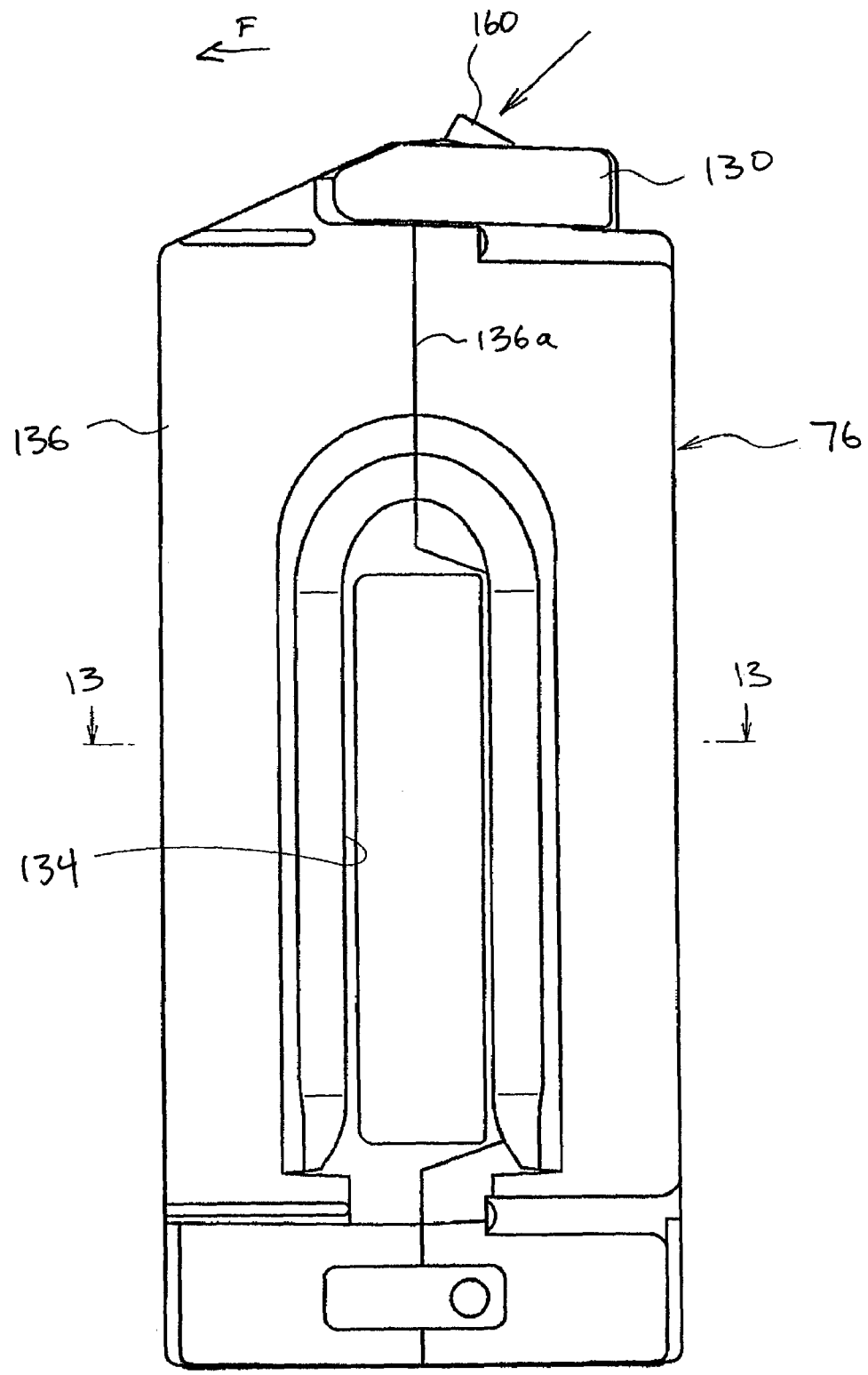
FIG. 9 is a left side view of the battery of the scooter of FIG. 1.

With reference to FIGS. 5 and 9, the battery 76 includes a guide recess 134, which is shaped complimentary to the guide member 132, and is further illustrated in FIGS. 9–15. Preferably an upper end of the guide member 132 is rounded, or arcuate in shape, to permit the guide recess 134 of the battery 76 to be engaged with the guide member 132 easily, such as when the battery 76 is misaligned with the battery chamber 114, for example, upon initially inserting the battery 76 into the chamber 114. The guide recess 134 is defined by an enclosure, or outer casing 136, of the battery 76. The guide recess 134 is configured to provide structural benefits to the casing 136, in addition to facilitating placement of the battery 76 into the battery chamber 114 of the casing 110.

Alternatively, the battery 76 may include a projecting guide member, while the battery chamber 114 may define a recess complimentary to the guide member of the battery 76. In addition, other structures apparent to one of skill in the art for aligning the battery 76 with the battery chamber 114 may be used, although the above-described arrangement is preferred.

In addition to the guide member 132 and guide recess 134, the battery chamber 114 also includes a plurality of guide ribs to further assist in aligning the battery 76 with the battery chamber 114. A first set of guide ribs 140 are defined by an inner surface of the casing 110. A second set of guide ribs 142 are defined by an upper, rearward surface of the battery support tray 112. The guide ribs 142 of the support tray 112 preferably are aligned with the guide ribs 140 of the casing 110. The guide ribs 140, 142 not only function to guide the battery 76 into proper alignment with the battery chamber 114, but also strengthen the casing 110 and battery support tray 112, respectively. In a preferred embodiment, the casing 110 and support tray 112 are constructed from a polymer material. Accordingly, the ribs 140, 142 preferably are relatively thin and, more preferably, substantially the same thickness as walls of the casing 110 and support tray 112, respectively, to inhibit distortion of the casing 110 and tray 112 after molding.

Although the seat assembly 30, in a closed position, may be utilized to retain the battery 76 within the battery chamber 114, preferably the illustrated mounting arrangement includes a mechanism 144 configured to apply a downward force on the battery 76. The mechanism 144 operates to maintain the battery 76 in contact with the terminals 124 of the battery support tray 112. In the illustrated arrangement, a lid 146 is configured to selectively close the port 116 of the battery chamber 114. The mechanism 144 for applying a downward force to the battery 76 includes a pair of biasing members, such as springs 148 supported from an upper, interior surface of the lid 146 and configured to apply a force to the battery 76 when the lid 146 is in a closed position tending to push the battery 76 toward the support tray 122 within the chamber 114.

A forward end of the lid 146 includes a hinge assembly 150, which is configured to permit the lid 146 to pivot forwardly away from the port 116 of the battery chamber 114. The lid 146 also includes a retaining assembly to retain the lid 146 in a closed position. The retaining assembly includes a hook 152 connected to, or integral with, the lid 146. With reference to FIG. 5, an engagement fitting 154 is fixed relative to the casing 110 and defines an engagement opening 156. The hook 152 is biased to engage the engagement opening 156 when the lid 146 is in a closed position thereby retaining the lid 146 in the closed position. An actuator 158 is movable (as indicated by the arrow in FIG. 5) to disengage the hook 152 from the engagement opening 156 and permit the lid 146 to be opened. Alternatively, other suitable arrangements to selectively secure the lid 146 in a closed position and permit its opening may also be used.

Figure 7:
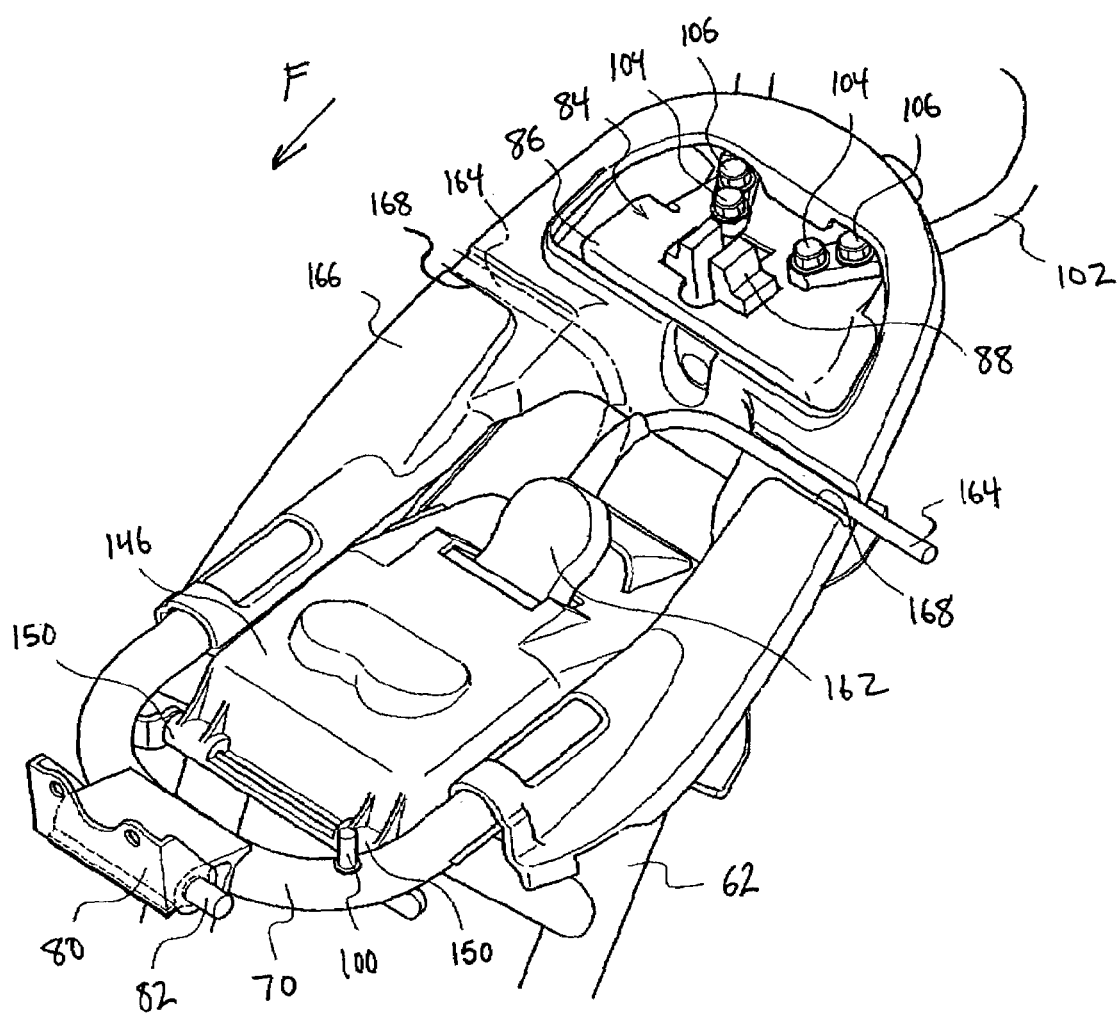
FIG. 7 is a perspective view of a rear portion of the scooter of FIG. 1, illustrating a charging device connected to the battery of the scooter.

With reference to FIGS. 7 and 9, the illustrated battery mounting arrangement includes features that provide for convenient recharging of the battery 76, if suitable for use with the type of battery employed in the scooter 20. Preferably, an upper end of the battery 76 includes a port 160 configured to permit connection of the battery 76 to a recharging device. Specifically, the port 160 is configured to receive an adapter end, or socket 162, of a recharging device. The recharging device may be of any suitable construction to permit recharging of the specific type of battery 76 employed in the scooter 20. For example, the recharging device may be configured to plug directly into a common wall outlet.

As described above, preferably the battery 76 is of an elongate construction and is canted at approximately the same rearward angle as the seat support frame 60. Thus, an axis of the battery 76 is also canted rearwardly at approximately the same angle as the support frame 60. With reference to FIG. 9, the recharging port 160 is canted relative to the axis of the battery 76 such that an axis of the recharging port 160, generally indicated by the arrow in FIG. 9, and the axis of the battery 76 define an oblique angle therebetween.

In the illustrated embodiment, the axis of the recharging port 160 is generally aligned with the extension portion 62 (FIG. 5) of the seat support frame 60. Advantageously, with such an arrangement the seat assembly 30 may be closed while the socket 162 of the recharging device is connected to the battery 76. Accordingly, the appearance of the scooter 20 is not impaired during recharging of the battery 76, such as may occur if the seat assembly 30 was required to remain in an open position during a recharging process. In addition, tampering with, or theft of, the recharging device is inhibited.

Commonly, the recharging device includes an electrical cord 164 extending from the socket 162 to the main body of the recharging device, or directly to a source of electricity, such as a typical wall outlet, for example. Advantageously, the scooter 20 is configured to accommodate the cord 164 with the seat assembly 30 in a closed position. Preferably, a body member, or cover 166, is supported between the frame assembly 22 and the seat assembly 30 of the scooter 20. In the illustrated arrangement, the cover 166 is supported, at a forward end, by the first seat stay 66 and, at a rearward end, by the extension 62 of the seat support frame 60.

The cover 166 defines a pair of channels 168 rearward of the recharging port and extending laterally to a peripheral edge of each side of the cover 166. The channels 168 are adapted to accommodate and route the recharging cord 164 from the battery recharging port 160 through a space between the frame assembly 22 and the seat assembly 30 of the scooter 20. Preferably, channels 168 are provided on each side of the cover 166 such that the recharging cord 164 is able to extend from either of the left side or right side of the scooter 20. With such an arrangement, the recharging device may be positioned on either side of the scooter 20 in instances when, for example, available space for the scooter 20 is limited. Although the illustrated channels 168 are formed by the cover 166, alternate arrangements are possible wherein the channel(s) are formed by a different component of the scooter 20, such as the frame assembly 22 or seat assembly 30, for example.

FIGS. 9–15 illustrate a preferred embodiment of the battery 76. As described above, preferably, the battery 76 includes a handle 130 and recharging port 160 at its upper end and terminals 126 at its lower end. Preferably, the battery enclosure, or casing 136, substantially encapsulates the internal components of the battery 76 to protect them from foreign material, such as heat, light, dust, water, and the like. Preferably, the guide recess 134 is defined by a left side of the casing 136. The illustrated casing 136 is of a two-piece configuration and defines a seam 136a extending along the top, bottom and lateral sides thereof.

The illustrated casing 136 is substantially rectangular in horizontal cross-section and defines a maximum lateral width D1 and a maximum longitudinal width D2. Preferably, the width D1 is smaller than the width D2, both of which preferably are smaller than a length, or height, of the casing 136, which extends substantially parallel to the seat support frame 60 and defines the axis of the battery 76.

Such an arrangement efficiently utilizes space and facilitates a traditional appearance of the scooter 20. For example, with the longitudinal width D2 being greater than the lateral width D1, the horizontal cross-sectional size of the battery 76 is arranged to correspond to an available area beneath the seat assembly 30, which typically has a greater dimension along a longitudinal axis of the scooter 20 than its dimension along a lateral axis. In addition, with the height of the battery 76 being greater than either the width D1 or D2, the available space between the seat assembly 30 and the frame assembly 21 is efficiently utilized.

The battery 76 may be of any suitable type. In one arrangement, the battery 76 may be a fuel cell battery. The illustrated battery 76 includes a plurality of secondary, or battery, cells 170 enclosed within the casing 136. The battery cells 170 are illustrated schematically in FIGS. 10 and 13. An upper portion of the interior of the casing 136 defines a battery storage chamber 172a, which is separated from a control circuit chamber 172b by a centrally open partition 173. The control circuit chamber 172b houses a control circuit 174, which controls charging and discharging of the battery cells 170. The casing 136 includes a plurality of drain openings 176 (FIGS. 10 and 11) to permit any water within the interior space of the casing 176, from condensation for example, to drain out of the casing 176.

The plurality of battery cells 170 preferably are vertically stacked in columns within the battery storage chamber 172a. The battery cells 170 may be oriented lengthwise in the lateral direction, as illustrated schematically in FIG. 10, or lengthwise in the longitudinal direction, as illustrated schematically in FIG. 13. In addition, multiple columns of battery cells 170 may be provided. Preferably, a lowermost battery cell 170 is connected to the control circuit 174 by a ground cable such that a relatively short ground cable may be used. Thus, problems associated with noise interfering with signals traversing the ground cable may be reduced, if not eliminated.

Figure 16:
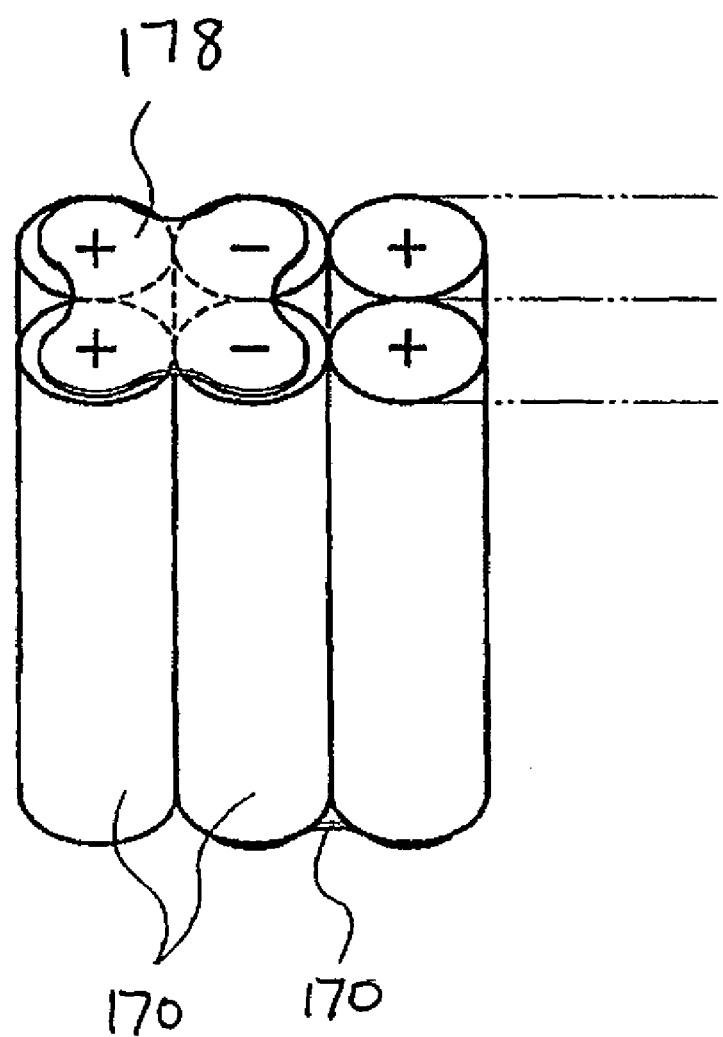
FIG. 16 is an illustration of a terminal connection arrangement between a plurality of cells of the battery of FIG. 9.

With reference to FIG. 16, in the illustrated embodiment, the plurality of battery cells 170 are connected in series, preferably by a plurality of coupling terminals 178. The coupling terminals 178 are configured to connect the positive terminals of each battery cell 170 within a column to the negative terminals of an adjacent battery cell 170 within the same column. The illustrated coupling terminals 178 are configured to connect adjacent battery cells 170 of multiple columns simultaneously. However, other suitable arrangements may also be used.

Although this invention has been disclosed in the context of a preferred embodiment and certain examples, it will be understood by those skilled in the art that the present invention extends beyond the specifically disclosed embodiments to other alternative embodiments and/or uses of the invention and obvious modifications and equivalents thereof. In particular, while the present battery mounting arrangement has been described in the context of a particularly preferred embodiment, the skilled artisan will appreciate, in view of the present disclosure, that certain advantages, features and aspects of the system may be realized in a variety of other applications, many of which have been noted above. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiment described above, but should be determined only by a fair reading of the claims.

What is claimed is:

1. An electrically-powered vehicle comprising at least one front wheel, at least one rear wheel and a frame assembly, a seat assembly supported by the frame assembly, a battery disposed beneath the seat assembly and extending along a longitudinal axis at an acute angle relative to a vertical plane, the seat assembly movable from a closed, operational position to an open position to permit withdrawal of the battery from a battery casing, the battery including a charging port configured to receive a socket of a charging device, an axis of the charging port being at an oblique angle relative to the longitudinal axis of the battery, at least one channel between the frame assembly and the seat assembly configured to permit an electrical cable of a charging device to pass therethrough when the seat assembly is in the closed position.

2. The vehicle of claim 1, wherein the at least one channel comprises a right-side channel and a left-side channel positioned on a right-side and a left-side of the vehicle, respectively.

3. The vehicle of claim 1, wherein the at least one channel is defined by a body member of the scooter disposed between the seat assembly and the frame assembly.

4. An electrically-powered scooter, comprising:
a front wheel;
a rear wheel;
a frame assembly including a left frame rail and a right frame rail spaced from one another, the frame assembly supported by at least one of the front and rear wheels;
a handlebar assembly coupled to the frame assembly; and
a seat assembly supported on a rearward portion of the frame assembly extending above at least a portion of the rear wheel, the rearward portion inclined at an acute angle relative to a vertical plane, the rails of the frame assembly extending between the handlebar assembly and the seat assembly so as to define an open area therebetween configured to allow a user to step therethrough to mount the scooter, a battery support extending between the frame rails beneath the seat assembly, and a battery supported by the battery support so as to extend along a longitudinal axis at an acute angle relative to the vertical plane, a battery casing including an elongated first guide surface, the battery including a second guide surface configured to engage the first guide surface so as to guide the battery into the casing, the battery including a charging port configured to receive a socket of a charging device, an axis of the charging port extending at an oblique angle relative to the axis of the battery.

5. The scooter of claim 4, wherein each of the left frame rail and the fight frame rail include a main frame portion and a seat support portion, the seat support portion extending in an upward direction from the main frame portion.

6. The scooter of claim 4, wherein the battery is connectable to an electrical component of the scooter by an electrical cable having a first portion connected to the battery and a separate, second portion connected to the electrical component, the first portion and the second portion of the electrical cable coupled by a connector disposed underneath the battery support.

7. The scooter of claim 6, wherein the electrical component comprises a power unit adapted to drive the rear wheel of the scooter.

8. The scooter of claim 4, wherein a lower surface of the battery support is inclined relative to a horizontal plane, a relatively higher side of the lower surface including electrical connection terminals and a relatively lower side of the lower surface including at least one drain hole.

9. The scooter of claim 4, wherein the vertical dimension of the battery is greater than either of a longitudinal or lateral dimension of the battery when positioned on the battery support of the scooter.

10. The scooter of claim 4, wherein an upper end of the battery includes a handle.

11. The scooter of claim 4, wherein an upper end of the battery includes the charging port configured to receive a socket of the charging device, an axis of the charging port being at an oblique angle relative to the longitudinal axis of the battery.

12. The scooter of claim 11, wherein a portion of the frame assembly extending above a height of an upper surface of the battery is inclined relative to the longitudinal axis of the battery, and wherein the axis of the charging port is generally aligned with the inclined portion of the frame assembly.

13. The scooter of claim 4, wherein a control circuit of the battery is located at a lower end of the battery.

14. The scooter of claim 4, wherein the battery is a fuel cell.

15. The scooter of claim 4, wherein the casing is configured to substantially completely enclose the battery.

* * * * *

UNITED STATES PATENT AND TRADEMARK OFFICE
CERTIFICATE OF CORRECTION

PATENT NO.        : 7,117,966 B2                                        Page 1 of 1
APPLICATION NO. : 10/641257
DATED             : October 10, 2006
INVENTOR(S)       : Kohda et al.

It is certified that error appears in the above-identified patent and that said Letters Patent is hereby corrected as shown below:

Title Page, Item (56) Ref. Cited

After "6,644,693" please replace "B1" with -- B2 --

After "6,679,345" please replace "B1" with -- B2 --

After "6,699,616" please replace "B1" with -- B2 --

On Page 2, after "6,722,460" please replace "B1" with -- B2 --

In Column 9, Line 27, please replace "axis." with -- axis --

In Column 12, Line 13, Claim 5, please replace "fight" with -- right --

Signed and Sealed this

Eighth Day of May, 2007

JON W. DUDAS
*Director of the United States Patent and Trademark Office*